United States Patent
Kingston et al.

(10) Patent No.: US 11,912,899 B2
(45) Date of Patent: Feb. 27, 2024

(54) FILM, LIQUID PAINT AND METHOD

(71) Applicant: Sony Group Corporation, Tokyo (JP)

(72) Inventors: Samuel Kingston, Stuttgart (DE); Tonino Greco, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/696,886

(22) Filed: Mar. 17, 2022

(65) Prior Publication Data

US 2022/0306873 A1 Sep. 29, 2022

(30) Foreign Application Priority Data

Mar. 24, 2021 (EP) .................................... 21164636

(51) Int. Cl.

| | | |
|---|---|---|
| *C09D 5/32* | (2006.01) | |
| *C09D 7/40* | (2018.01) | |
| *C09D 7/62* | (2018.01) | |
| *C09D 163/00* | (2006.01) | |
| *C09C 1/30* | (2006.01) | |
| *C09C 3/08* | (2006.01) | |
| *C08K 9/04* | (2006.01) | |

(52) U.S. Cl.
CPC .............. *C09D 5/32* (2013.01); *C09C 1/3063* (2013.01); *C09C 3/08* (2013.01); *C09D 7/62* (2018.01); *C09D 7/67* (2018.01); *C09D 163/00* (2013.01); *C01P 2004/64* (2013.01); *C08K 9/04* (2013.01); *C08K 2201/011* (2013.01)

(58) Field of Classification Search
CPC ... C09D 5/32; C09D 7/62; C09D 7/67; C09D 163/00; C09C 1/3063; C09C 3/08; C08K 9/04
See application file for complete search history.

(56) References Cited

U.S. PATENT DOCUMENTS

| | | | |
|---|---|---|---|
| 2004/0126582 A1 | 7/2004 | Ng et al. | |
| 2013/0186466 A1 | 7/2013 | Hebrink et al. | |
| 2016/0194481 A1 | 7/2016 | Condo et al. | |
| 2017/0140221 A1* | 5/2017 | Ollila ..................... | G02F 1/157 |
| 2020/0366853 A1* | 11/2020 | Song ................ | H01L 27/14683 |

FOREIGN PATENT DOCUMENTS

WO 2019/155244 A1 8/2019

OTHER PUBLICATIONS

Zofia E. Siwicka, Florencia A. Son, Claudia Battistella, Martin H. Moore, Joanna Korpanty, Naneki C. McCallum, Zheng Wang, Brandy J. Johnson, Omar K. Farha, and Nathan C. Gianneschi, Synthetic Porous Melanin, J. Am. Chem. Soc. 2021, 143, 3094-3103 (Year: 2021).*

A. Tripathi, J. S. Melo, Self-assembled biogenic melanin modulated surface chemistry of biopolymers-colloidal silica composite porous matrix for the recovery of uranium, J. Appl. Polym. Sci. 2019, DOI: 10.1002/APP.46937 (Year: 2019).*

Davis et al., "Diverse Nanostructures Underlie Thin Ultra-Black Scales in Butterflies", Nature Communications, Department of Biology, Available Online at: https://doi.org/10.1038/s41467-020-15033-1, pp. 1-7.

* cited by examiner

*Primary Examiner* — Bijan Ahvazi
(74) *Attorney, Agent, or Firm* — XSENSUS LLP

(57) ABSTRACT

A film for absorbing visible light, including:
a plurality of silica nanoparticles, wherein a surface of at least a part of the plurality of silica nanoparticles is functionalized with a plurality of pigment molecules of a Melanin type compound.

17 Claims, 5 Drawing Sheets

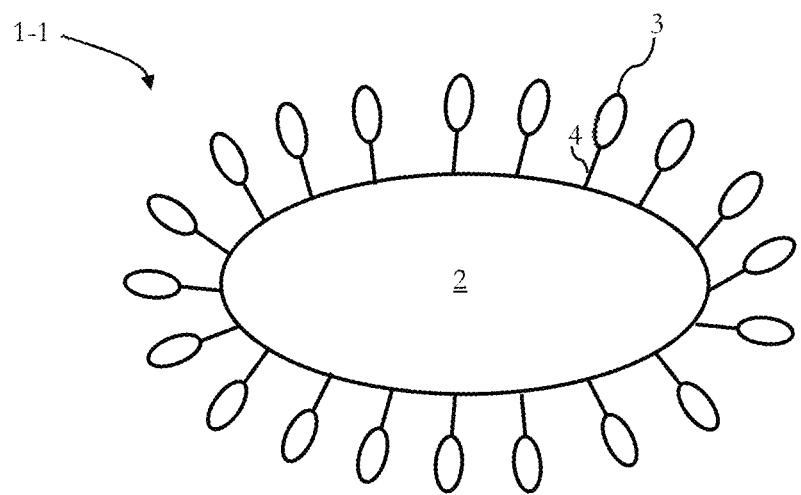
Fig. 1
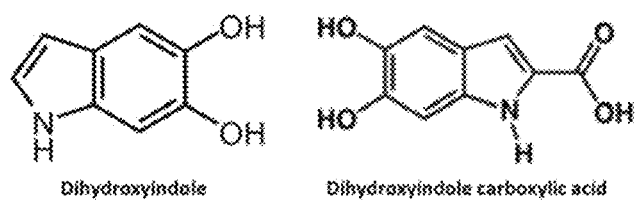
Dihydroxyindole    Dihydroxyindole carboxylic acid
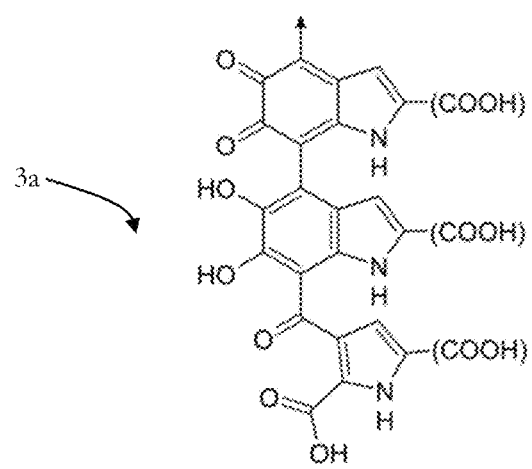
Fig. 2    Eumelanin Polymer

FILM, LIQUID PAINT AND METHOD

CROSS-REFERENCE TO RELATED APPLICATION

The present application claims priority to European Patent Application No. 21164636.9, filed Mar. 24, 2021, the entire contents of which are incorporated herein by reference.

TECHNICAL FIELD

The present disclosure generally pertains to a film for absorbing visible light, a liquid paint for absorbing visible light and a method for providing a film for absorbing visible light.

TECHNICAL BACKGROUND

Generally, nanoparticles, nanotubes, etc. are known which may have size, shape and structure dependent properties such as optical absorption and emission, reactivity and toughness. Such materials have attracted increasing interest due to their potential use in a variety of applications such as catalysis, photocatalysis, imaging applications, optical display devices and biomedicine.

Additionally, light-absorbing surface coatings are known. For example, a carbon nanotube light-absorbing surface coating is known which may absorb visible light and may provide a black surface coating.

Although there exist techniques for light-absorbing surface coatings, it is generally desirable to improve the existing techniques.

SUMMARY

According to a first aspect the disclosure provides a film for absorbing visible light, comprising:
  a plurality of silica nanoparticles, wherein a surface of at least a part of the plurality of silica nanoparticles is functionalized with a plurality of pigment molecules of a Melanin type compound.

According to a second aspect the disclosure provides a liquid paint for absorbing visible light, comprising:
  a plurality of silica nanoparticles, wherein a surface of at least a part of the plurality of silica nanoparticles is functionalized with a plurality of pigment molecules of a Melanin type compound.

According to a third aspect the disclosure provides a method for providing a film for absorbing visible light, the method comprising:
  providing a plurality of silica nanoparticles on a surface of an object, wherein a surface of at least a part of the plurality of silica nanoparticles is functionalized with a plurality of pigment molecules of a Melanin type compound.

Further aspects are set forth in the dependent claims, the following description and the drawings.

BRIEF DESCRIPTION OF THE DRAWINGS

Embodiments are explained by way of example with respect to the accompanying drawings, in which:

FIG. 1 schematically illustrates a first embodiment of a silica nanoparticle with functionalized surface;

FIG. 2 schematically illustrates an embodiment of a Eumelanin type compound;

DETAILED DESCRIPTION OF EMBODIMENTS

Figure 3:
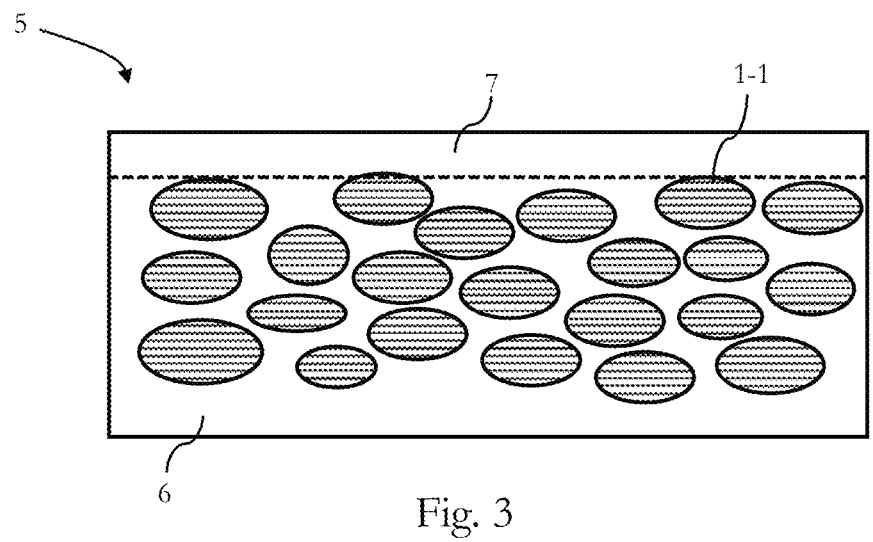
FIG. 3 schematically illustrates a first embodiment of a film for absorbing visible light.

Before a detailed description of the embodiments under reference of FIG. 1 is given, general explanations are made.

As generally known, stray light sources within image sensor modules of cameras and telescopes may affect an overall performance and an accuracy of the instrument. In image modules, for example, it may limit a dynamic range and a signal-to-noise ratio ("SNR") as it sets how dark an environment can be. Moreover, it may limit detection capabilities of telescopes and cameras, e.g. in astronomy, by effectively rendering objects in the viewing path invisible.

Typically, stray light sources may result from incident light in the viewing path or from light reflected at internal components in the telescope or the image module. For example, lens-flare may be a problematic image artefact caused by stray light, as generally known. It may limit a quality of images and videos with obscured objects.

Hence, it has been recognized that a light-absorbing material or light-absorbing surface coating may be useful in such imaging or optical instruments, since it may remove randomly generated stray light within a lens housing of the instrument. This may increase the overall performance of the instrument and may help reducing undesired effects of the stray light.

As mentioned in the outset, generally, light-absorbing surface coatings are known. For example, a carbon nanotube ("CNT") light-absorbing surface coating is known which may absorb visible light and may provide a black surface coating.

However, as generally known, CNTs may typically be sensitive to mechanical forces, for example, they may be touch and shock sensitive.

As also mentioned in the outset, generally, nanoparticles are known which may have size, shape and structure dependent properties such as optical absorption and emission, reactivity and toughness.

Typically, as generally known, methods for producing nanoparticles may offer a scale-up potential, since they may typically be fast and simple. Moreover, as generally known, nanoparticles may be resistant to mechanical forces.

Additionally, surface functionalization of nanoparticles is known, for example, a chemical structure of the surface is processed, molecules are attached to the surface, etc. This may affect an interaction of the nanoparticles with their environment and may affect other properties of the nanoparticles as well.

Furthermore, a variety of pigment compounds are known which absorb visible light. Among such pigment compounds, natural pigment compounds are found in biological structures which may be used by animals or plants for biological purposes such as camouflage, aposematism, etc. Typically, Melanin type compounds may absorb a broad range of wavelengths of visible light.

Thus, it has been recognized that pigment molecules of a Melanin type compound may be attached or chemically bonded to a nanoparticle, in particular, to a silica ($SiO_2$) nanoparticle for absorbing visible light.

Moreover, it has been recognized that silica nanoparticles functionalized with a Melanin type compound may be used in a black surface coating for reducing stray light issues in optical instruments.

Consequently, some embodiments pertain to a film for absorbing visible light, including:

a plurality of silica nanoparticles, wherein a surface of at least a part of the plurality of silica nanoparticles is functionalized with a plurality of pigment molecules of a Melanin type compound.

Some embodiments pertain to a method for providing a film for absorbing visible light, the method including providing a plurality of silica nanoparticles on a surface of an object, wherein a surface of at least a part of the plurality of silica nanoparticles is functionalized with a plurality of pigment molecules of a Melanin type compound.

The film may be used as a black surface coating (on a surface of an object) in light source units (e.g. LED Bayer arrays in display devices and the like), image sensors, optical lens units (e.g. inside of a housing of camera objectives, telescopes, etc.), photolithography masks, holographic displays, camouflage applications, photovoltaic cells, etc.

The film may be provided by applying a liquid paint to a substrate or generally to a surface of an object and drying the liquid paint such that the film is formed on the surface by adhesion.

Hence, some embodiments pertain to a liquid paint for absorbing visible light, including:

a plurality of silica nanoparticles, wherein a surface of at least a part of the plurality of silica nanoparticles is functionalized with a plurality of pigment molecules of a Melanin type compound.

In the following, the film, the liquid paint and the method for providing a film for absorbing visible light are thus discussed in parallel and embodiments as described herein apply to each of the film, the liquid paint and the method if not stated otherwise.

Generally, the film (which may be provided as is or as a result of a liquid paint applied to a surface, as discussed) includes a plurality of silica nanoparticles which have light-absorbing pigment molecules of a Melanin type compound on the surface.

In some embodiments, a silica core of the plurality of silica nanoparticles is removed. The silica core may be removed by etching the surface of the object on which the plurality of silica nanoparticles is applied with hydrofluoric acid (HF). After removal of the silica cores, the remaining film may include hollow Melanin type compound spheres, ellipsoids or the like (depending on the shape of the silica core(s)). In some embodiments, the plurality of silica nanoparticles is embedded in a polymeric matrix. In some embodiments, the liquid paint further includes a polymer.

In such embodiments, the film may be a (flexible) plate-shaped three-dimensional body having lateral dimensions larger than a thickness of the film without limiting the disclosure in this regard. The film may be provided as a flexible foil which can be applied to a surface to provide a black surface coating. The film may be provided by applying a liquid paint to a substrate (surface) or on a surface of an object and drying the liquid paint such that the film is formed on the surface in which the plurality of silica nanoparticles is embedded in a polymeric matrix.

Basically, the polymeric matrix provides mechanical stability and flexibility to the plurality of silica nanoparticles, while also holding them in a close packed geometry.

The polymer and the polymeric matrix may be or may be based on or may include a resin, an epoxy resin, a plastic or a biodegradable polymer, or a combination thereof.

The polymer and the polymeric matrix may be or may be based on or may include polyesters, epoxies, polyurethanes, polyamides, melamine, phenolic resins, polyethylene, polystyrene, polymethyl methacrylate, polyvinyl chloride, etc.

The plurality of silica ($SiO_2$) nanoparticles are basically transparent and can be produced with a diameter in the range of, for example, 5 nm ("nanometer") and (to) 1 μm ("micrometer") without the limiting the disclosure in this regard. The plurality of silica nanoparticles may be of ellipsoid shape which may confer mechanical stability by design.

Thus, the thickness of the film may depend on the diameter of the nanoparticles and the number of layers in which the nanoparticles are arranged. For instance, in the case of one layer of nanoparticles, the thickness (height) may be in the range of 5 nm ("nanometer") to 1 μm ("micrometer"), for two layer the thickness may be doubled and, thus, in the range of 10 nm ("nanometer") to 2 μm ("micrometer"), for three layers the thickness may be in the range of 15 nm ("nanometer") to 3 μm ("micrometer"), etc., without limiting the present application to the specific exemplarily given ranges.

The plurality of silica nanoparticles may be produced by known methods such as colloidal synthesis. Other known methods are, for example, a sol-gel process, a reverse microemulsion or flame synthesis.

In colloidal synthesis, the plurality of silica nanoparticles may be produced in solution with an ethanol-water mixture as a solvent. Other solvents may be one of a non-polar solvent such as an alkane, an alkene, toluene, chloroform or the like, or a polar solvent such as an alcohol, an acetamide, a formamide, an ester, water, or the like, volatile solvent such as ethanol, hexane, chloroform or the like, or a combination (mixture) thereof.

At least a part of the plurality of silica nanoparticles is functionalized with a plurality of pigment molecules of a Melanin type compound.

Generally, (surface) functionalization is known which includes techniques for modifying physical and chemical properties of a surface such as roughness, hydrophilicity, solubility, surface charge, surface energy, reactivity, optical properties, etc. For instance, specific functional groups are chemically introduced to a surface for creating specific surface sites. Another example is a binding of specific molecules to the surface for various purposes, for example, in biomedical applications for drug targeting or catalysis.

For example, the plurality of pigment molecules are inserted in a solution of the plurality of silica nanoparticles previously produced and the surface of the at least part of the plurality of silica nanoparticles is functionalized with the plurality of pigment molecules by self-assembly such that a bond is formed. The bond may be an ionic bond or a covalent bond.

The polymer may be inserted into the solution and the solution is applied to a substrate (e.g. by spraying or spin-coating) and dried such that the film is formed.

Generally, Melanin is a broad term for a group of natural pigments found in many organisms. Subtypes of Melanin are Eumelanin, Pheomelanin and Neuromelanin.

Melanin and its sub-types do not have a definite structural representation as they may be polymeric in nature and may have a variety of monomers. For example, including 5,6-dihydroxyindole (DHI) and 5,6-dihydroxyindole-2-carboxylic acid (DHICA) which may form crosslinked polymers of numerous compositions.

An overview of Melanin type compounds, which may be used in some embodiments, is given, for instance, in: F. Solano, "Melanins: Skin Pigments and Much More—Types, Structural Models, Biological Functions, and Formation Routes", New Journal of Science, Volume 2014, Article ID 498276, 28 pages, DOI: 10.1155/2014/498276. Another overview of Melanin type compounds, which may be used in some embodiments, is given, for instance, in: Cao et al., "Unraveling the Structure and Function of Melanin through Synthesis", Journal of the American Chemical Society JACS) 2021, 143, 7, 2622-2637, DOI: 10.1021/jacs.0c12322.

In some embodiments, the Melanin type compound is a Eumelanin type compound.

Eumelanin type compounds as a sub-type of Melanin type compounds do not have a definite structural representation as well due to the possible polymeric nature.

However, Eumelanin type compounds are (mainly) based on indole type units obtained from L-dopa or L-tyrosine oxidation such that the Eumelanin type compounds may be based on dihydroxyindole and dihydroxyindole carboxylic acid. In some embodiments, a composition of the plurality of pigment molecules of the Eumelanin type compound is $C_{18}H_{10}O_4N_2$.

The Melanin type compounds and the Eumelanin type compound may have a light absorption edge in the red, for example, for wavelengths smaller than about 750 nm, the pigment molecules attached to the surface of the silica nanoparticles start absorbing visible light and, thus, a black coating may be provided.

In some embodiments, a top layer of the polymeric matrix is removed such that some of the plurality of silica nanoparticles are located at a surface of the polymeric matrix.

This removal may be performed by a wet-grinding process or abrasive particle blasting, as generally known.

This may mitigate surface reflection effects from the surface of the polymeric matrix, since the light-absorbing pigments are located at the surface.

In some embodiments, the polymeric matrix is nanostructured for increasing an effective surface area, thereby increasing light absorbance of the film. The polymeric matrix may be nanostructured based on lithography methods, etching methods, etc.

Diverse nanostructures which increase an effective surface area to increase light absorbance are known, for example, from animals which utilize these nanostructures to achieve an ultra-black coloration, as discussed in: Davis et al., "Diverse nanostructures underlie thin ultra-black scales in butterflies", Nature Communications 11, 1294 (2020). DOI: 10.1038/s41467-020-15033-1.

In some embodiments, the plurality of silica nanoparticles has an average size in a wavelength range of the visible light.

When an average size of the plurality of silica nanoparticles is comparable to wavelengths of visible light that is incident onto the film (for example, "green light" is typically considered to have wavelengths in the range of about 500-550 nm), a light scattering effect of the plurality of silica nanoparticles in the film may increase and, thus, may provide a trapping effect in the film which keeps the visible light in the film until it is absorbed by the pigment molecules.

In some embodiments, at least a part of pairs of neighboring pigment molecules of the plurality of pigment molecules is cross-linked.

Neighboring pigment molecules of a Melanin type compound may have functional groups in a vicinity of each other. A cross-link may be provided in the form of a covalent bond from each of the neighboring pigment molecules to a suitable compound.

In some embodiments, the cross-linked pairs of the pairs of neighboring pigment molecules of the plurality of pigment molecules are cross-linked based on a diamine.

In some embodiments, the cross-linked pairs of the pairs of neighboring pigment molecules of the plurality of pigment molecules are cross-linked based on a dihydrazide.

In some embodiments, the cross-linked pairs of the pairs of neighboring pigment molecules of the plurality of pigment molecules are cross-linked based on a borate ion.

In some embodiments, the cross-linked pairs of the pairs of neighboring pigment molecules of the plurality of pigment molecules are cross-linked based on a dicarbamate.

The cross-link may be based on a combination of the above, for example, different pairs of neighboring pigment molecules may have a different cross-link.

The cross-link between neighboring pigment molecules (of a Melanin type compound) may increase a stability of a bonding of the pigment molecules to the silica nanoparticles and may increase a chemical and optical stability of the pigment molecules.

Returning to FIG. 1, there is schematically illustrated a first embodiment of a silica nanoparticle 1-1 with a functionalized surface.

The silica ($SiO_2$) nanoparticle 1-1 with the functionalized surface has a silica core 2.

A plurality of pigment molecules 3 of a Eumelanin type compound is bonded to the surface of the silica core 2 by a bond 4 (which may be an ionic bond or a covalent bond).

Here, the silica core 2 and, thus, the silica nanoparticle 1-1 is of ellipsoid shape and may thus confer mechanical strength by design.

Moreover, the silica core 2 and, thus, the silica nanoparticle 1-1 has a size in a wavelength range of visible light. Here, the longest axis of the ellipsoid shape is 550 nm ("green").

FIG. 2 schematically illustrates an embodiment of the Eumelanin type compound 3a from the first embodiment of the silica nanoparticle 1-1 with functionalized surface of FIG. 1 discussed before.

The Eumelanin type compound 3a is based on indole type units obtained from L-dopa or L-tyrosine oxidation such that the Eumelanin compound is based on dihydroxyindole and dihydroxyindole carboxylic acid.

The arrow indicates a possible point for polymer growth of the Eumelanin type compound 3a. The brackets (COOH) indicate different possible groups or residues such as C—H, C—OH and C—O—OH.

FIG. 3 schematically illustrates a first embodiment of a film 5 for absorbing visible light.

The film 5 includes a polymeric matrix 6 which includes an epoxy resin.

The polymeric matrix 6 includes a plurality of silica nanoparticles 1-1 (see FIGS. 1 and 2 for details), wherein a surface of at least a part of the plurality of silica nanoparticles 1-1 is functionalized with a plurality of pigment molecules 3 of the Eumelanin type compound 3a.

The plurality of silica nanoparticles 1-1 has an average size in a wavelength range of visible light. Here, the longest axis of the ellipsoid shape is in average 550 nm ("green").

A top layer 7 of the polymeric matrix 6 (separated by the dashed line) is removed such that some of the plurality of silica nanoparticles 1-1 are located at a surface of the polymeric matrix 6.

This removal may be performed by a wet-grinding process or abrasive particle blasting, as discussed.

This may mitigate surface reflection effects from the surface of the polymeric matrix, since the light-absorbing pigment molecules 3 are located at the surface of the polymeric matrix 6.

Generally, the film 5 relates to a light-absorbing material with integrated functionalized silica nanoparticles 1-1, wherein the plurality of pigment molecules 3 absorbs a broad spectrum of visible light wavelengths. The silica nanoparticles 1-1 are thus functionalized with a surface coating of light-absorbing pigment molecules 3. These beads are immobilized in a polymeric matrix 6 for application in a variety of scenarios such as for stray light reduction in optical instruments when applied to an internal surface of a housing of optical parts.

Basically, the film 5 is flexible due to the polymeric matrix 6 and may have mechanical stability and durability (e.g. the film 5 may not be touch or shock sensitive) due to its mechanical deformation ability, the mechanical strength of the silica nanoparticles 1-1 and the support of them by the polymeric matrix 6. Moreover, the film 5 is manufactured in a simple (application of the film 5 at ambient temperatures), fast and cost-effective procedure (vacuum and high temperature environment is not required; raw materials and equipment are obtained cost-effectively) and, thus, offers a scale-up potential.

Hence, a cost-effective, flexible, mechanical and optical durable black surface coating is provided by the film 5 for visible light for a wide range of surfaces which are suitable for the application of the film 5.

Figure 4:
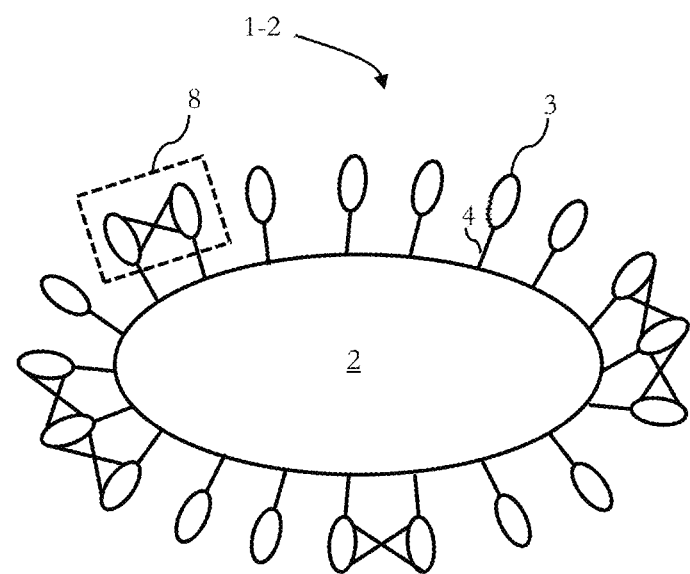
FIG. 4 schematically illustrates a second embodiment of a silica nanoparticle with functionalized surface.

FIG. 4 schematically illustrates a second embodiment of a silica nanoparticle 1-2 with functionalized surface.

The silica ($SiO_2$) nanoparticle 1-2 with the functionalized surface has a silica core 2.

A plurality of pigment molecules 3 of the Eumelanin type compound 3a is bonded to the surface of the silica core 2 by a bond 4 (which may be an ionic bond or a covalent bond).

Here, the silica core 2 and, thus, the silica nanoparticle 1-2 is of ellipsoid shape and may thus confer mechanical strength by design.

In the silica nanoparticle 1-2, at least a part of pairs of neighboring pigment molecules 8 of the plurality of pigment molecules 3 is cross-linked which is illustrated here by the dashed box 8.

The cross-link is based on a borate ion, as will be discussed with reference to FIG. 5 below.

The cross-link between neighboring pigment molecules 8 may increase a stability of a bonding of the plurality of pigment molecules 3 to the silica nanoparticles and may increase a chemical and optical stability of the plurality of pigment molecules 3.

Figure 5:
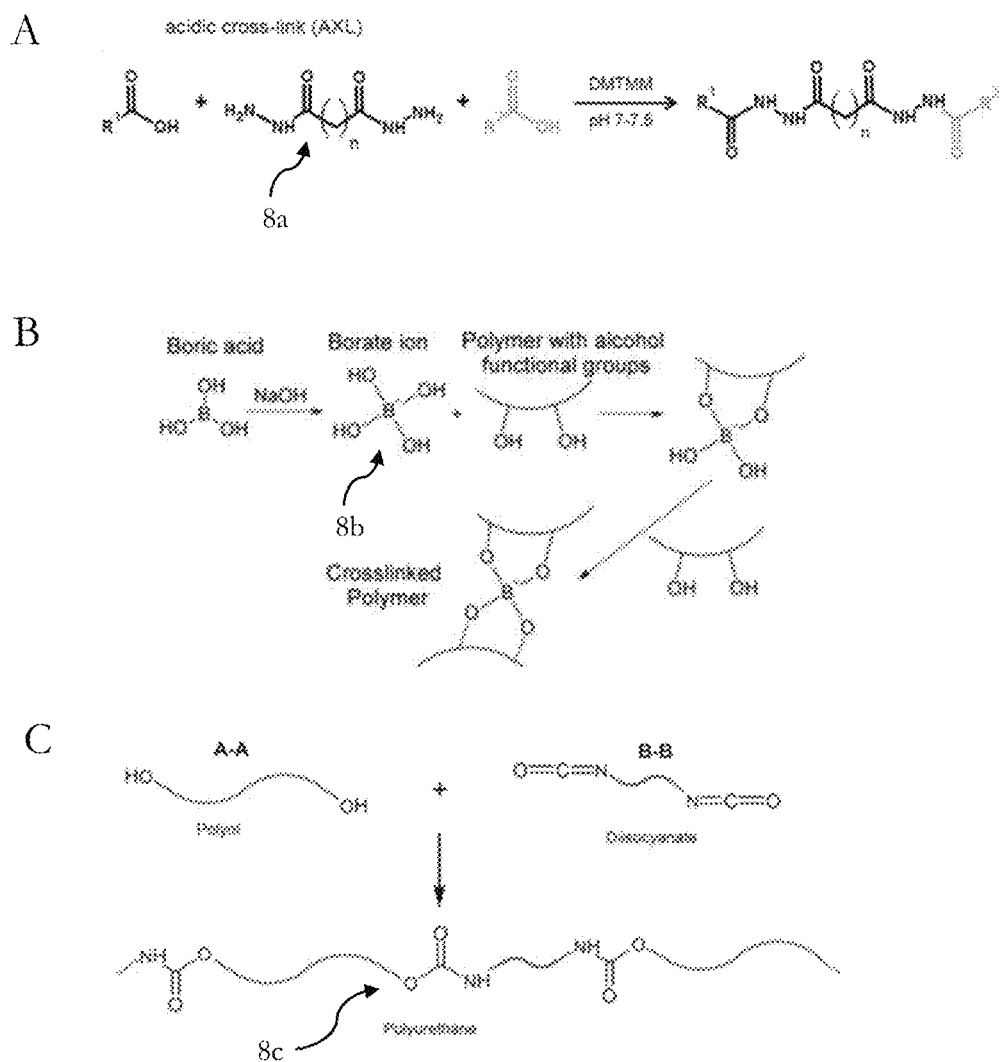
FIG. 5 schematically illustrates a first embodiment of a cross-link in FIG. 5A, a second embodiment of a cross-link in FIG. 5B and a third embodiment of a cross-link in FIG. 5C.

FIG. 5 schematically illustrates a first embodiment of a cross-link in FIG. 5A, a second embodiment of a cross-link in FIG. 5B and a third embodiment of a cross-link in FIG. 5C.

In FIG. 5A, an embodiment of acid cross-linking of the carboxylic acid residues of the Eumelanin type compound 3a is shown schematically by using a diamine or a dihydrazide 8a.

Here, R1 and R2 correspond to the moieties of a pair of two neighboring pigment molecules 8 of the Eumelanin compound 3a having a —COOH residue.

Once reacted, a cross-link based on a diamine or a dihydrazide 8a is provided between the pair of neighboring pigment molecules 8 of the Eumelanin type compound 3a.

In FIG. 5B, an embodiment of cross-linking based on a borate ion 8b (e.g. an anion) is shown schematically.

The borate ion 8b firstly attaches to one of the pigment molecules of the Eumelanin type compound 3a. Then, cross-linking of hydroxy moieties of the pair of neighboring pigment molecules 8 takes place.

Thus, a cross-link based on a borate ion 8b is provided between the pair of neighboring pigment molecules 8 of the Eumelanin type compound 3a.

In FIG. 5C, an embodiment of cross-linking based on a dicarbamate 8c is shown schematically.

A reaction of alcohol with isocyanate yields carbamates. A diisocyanate B-B reacting with two alcohols as part of a pair of two neighboring pigment molecules 8 of the Eumelanin type compound 3a yields a dicarbamate 8c, thereby providing a cross-link between the pair of neighboring pigment molecules 8 based on a dicarbamate 8c.

Thus, a cross-link based on a dicarbamate 8c is provided between the pair of neighboring pigment molecules 8 of the Eumelanin type compound 3a.

Figure 6:
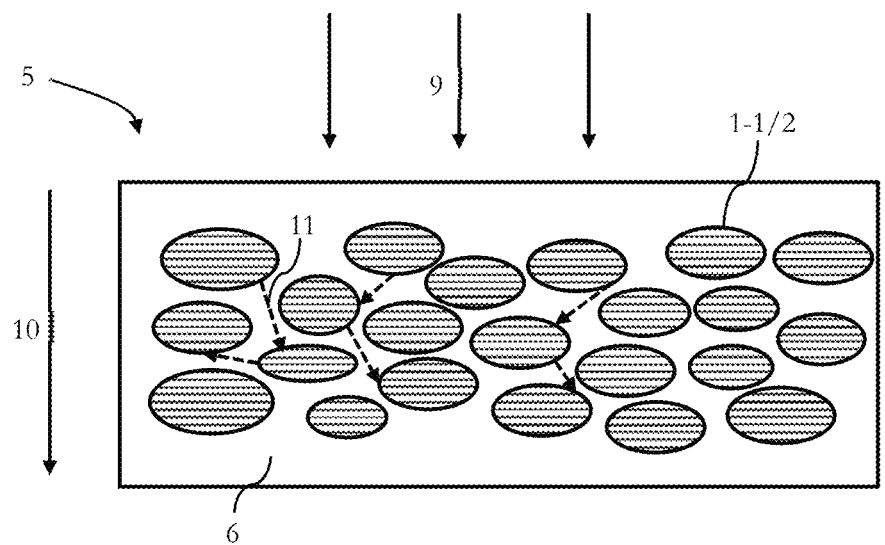
FIG. 6 schematically illustrates a second embodiment of a film for absorbing visible light.

FIG. 6 schematically illustrates a second embodiment of a film 5 for absorbing visible light.

The film 5 for absorbing visible light basically corresponds to the film 5 of FIG. 3. As an additional or alternative embodiment, the silica nanoparticles 1-2 of FIG. 4 are included in the polymeric matrix 6 instead of the silica nanoparticles 1-1 of FIG. 1. In other embodiments, silica nanoparticles 1-1 (FIG. 1) and 1-2 (FIG. 4) are present mixed in the polymeric matrix 6.

In the following, a light absorbing process in the film 5 will be discussed in more detail, which is based on two effects: an absorption process and a trapping effect.

Here, visible light 9 is incident onto the film 5, wherein the visible light 9 includes a plurality of wavelengths in a range which can be recognized by an average human (e.g. characterized by the luminosity function).

When the visible light 9 transmits through the film 5 in a depth direction 10, an amount of the visible light 9 (e.g. represented by an amount of photons) decreases due to absorption of the visible light by the plurality of pigment molecules 3 attached to the surface of the plurality of silica nanoparticles 1-1/2.

Moreover, the plurality of silica nanoparticles 1-1/2 scatter the visible light 9 which is illustrated here by the dashed arrows 11.

Accordingly, due to the scattering, the visible light 9 is trapped in the film 5 and, thus, a probability that the scattered light 11 is also absorbed, increases.

Thus, the film 5 provides a black coating for various applications.

Figure 7:
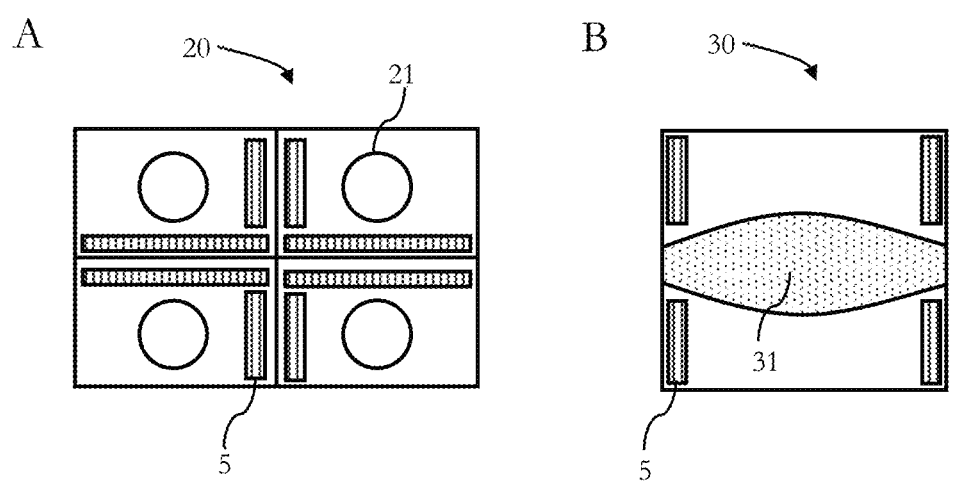
FIG. 7 schematically illustrates in a block diagram an embodiment of a light source unit in FIG. 7A and an embodiment of an optical lens unit in FIG. 7B.

FIG. 7 schematically illustrates in a block diagram an embodiment of a light source unit 20 in FIG. 7A and an embodiment of an optical lens unit 30 in FIG. 7B.

In FIG. 7A, a first application example of the film 5 (for details see FIG. 3 and FIG. 6) is shown.

The light source unit 20 includes four light sources 21.

The light sources 21 are here light emitting diodes ("LEDs") arranged in a Bayer array (the light source unit 20). The light source unit 20 may be part of a display device such as an LED display.

The film 5 is applied on a surface of a separating element between individual light sources 21 for improving color clarity observed by a viewer, since optical crosstalk may be reduced due to the black coating provided by the film 5.

In FIG. 7B, a second application example of the film 5 (for details see FIG. 3 and FIG. 6) is shown.

The optical lens unit 30 includes an optical lens portion 31 which may be configured to provide an objective in an optical camera.

As mentioned herein, a typical issue in photographic applications is stray light which may be due to internal reflections at the housing of the optical lens unit 30.

The film 5 is coated on an internal surface of the housing of the optical lens unit 30 and absorbs occurring stray light and, thus, may reduce stray light issues in optical cameras.

Figure 8:
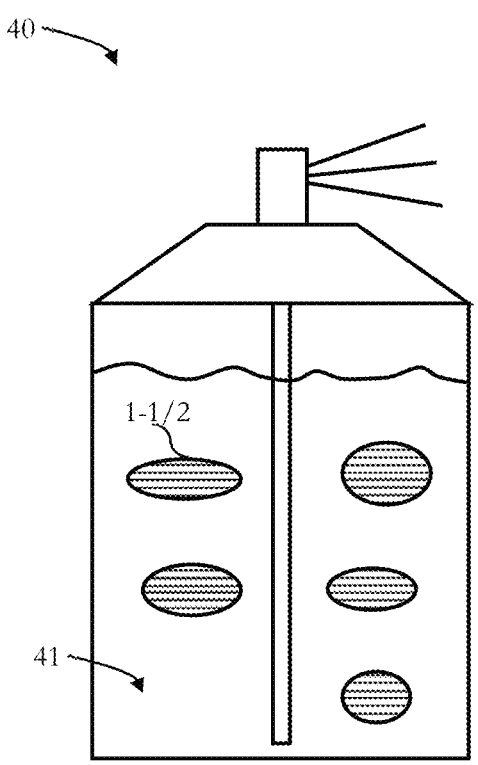
FIG. 8 schematically illustrates an embodiment of a liquid paint.

FIG. 8 schematically illustrates an embodiment of a liquid paint 41.

As mentioned herein, the film 5 may also be provided by spray coating onto a three-dimensional surface of an object which may be followed by a surface removal technique such as abrasive particle blasting.

A spray can 40 includes the liquid paint 41.

The liquid paint 41 includes a polymer, here an epoxy resin, and a plurality of silica nanoparticles 1-1/2 which correspond to the silica nanoparticle 1-1 of FIG. 1 (in an alternative embodiment the silica nanoparticle 1-2 of FIG. 4 or generally, they may also be present mixed).

With the spray can 40, the liquid paint 41 can be applied directly onto surfaces for providing a black surface coating.

Thus, complex three-dimensional objects, surfaces and shapes can be provided with a black coating in a fast and cost-effective manner (e.g. black anodizing of mechanical parts is not required anymore).

Note that the present technology can also be configured as described below.

(1) A film for absorbing visible light, including:
a plurality of silica nanoparticles, wherein a surface of at least a part of the plurality of silica nanoparticles is functionalized with a plurality of pigment molecules of a Melanin type compound.

(2) The film of (1), wherein the plurality of silica nanoparticles is embedded in a polymeric matrix.

(3) The film of (1) or (2), wherein the Melanin type compound is a Eumelanin type compound.

(4) The film of (2) or (3), wherein the polymeric matrix includes at least one of a resin, an epoxy resin, a plastic, and a biodegradable polymer.

(5) The film of anyone of (2) to (4), wherein the polymeric matrix is nanostructured for increasing an effective surface area, thereby increasing light absorbance of the film.

(6) The film of anyone of (2) to (5), wherein a top layer of the polymeric matrix is removed such that some of the plurality of silica nanoparticles are located at a surface of the polymeric matrix.

(7) The film of anyone of (1) to (6), wherein the plurality of silica nanoparticles has an average size in a wavelength range of the visible light.

(8) The film of anyone of (1) to (7), wherein at least a part of pairs of neighboring pigment molecules of the plurality of pigment molecules is cross-linked.

(9) The film of (8), wherein the cross-linked pairs of the pairs of neighboring pigment molecules of the plurality of pigment molecules are cross-linked based on a diamine.

(10) The film of (8) or (9), wherein the cross-linked pairs of the pairs of neighboring pigment molecules of the plurality of pigment molecules are cross-linked based on a dihydrazide.

(11) The film of anyone of (8) to (8), wherein the cross-linked pairs of the pairs of neighboring pigment molecules of the plurality of pigment molecules are cross-linked based on a borate anion.

(12) The film of anyone of (8) to (11), wherein the cross-linked pairs of the pairs of neighboring pigment molecules of the plurality of pigment molecules are cross-linked based on a dicarbamate.

(13) A liquid paint for absorbing visible light, including:
a plurality of silica nanoparticles, wherein a surface of at least a part of the plurality of silica nanoparticles is functionalized with a plurality of pigment molecules of a Melanin type compound.

(14) The liquid paint of (13), further including a polymer.

(15) The liquid paint of (13) or (14), wherein the Melanin type compound is a Eumelanin type compound.

(16) The liquid paint of (14) or (15), wherein the polymer includes at least one of a resin, an epoxy resin, a plastic and a biodegradable polymer.

(17) The liquid paint of anyone of (13) to (16), wherein at least a part of pairs of neighboring pigment molecules of the plurality of pigment molecules is cross-linked.

(18) The liquid paint of (17), wherein the cross-linked pairs of the pairs of neighboring pigment molecules of the plurality of pigment molecules are cross-linked based on a diamine or a dihydrazide.

(19) The liquid paint of (17) or (18), wherein the cross-linked pairs of the pairs of neighboring pigment molecules of the plurality of pigment molecules is cross-linked based on a borate anion.

(20) The liquid paint of anyone of (17) to (19), wherein the cross-linked pairs of the pairs of neighboring pigment molecules of the plurality of pigment molecules are cross-linked based on a dicarbamate.

(21) A method for providing a film for absorbing visible light, the method including:
providing a plurality of silica nanoparticles on a surface of an object, wherein a surface of at least a part of the plurality of silica nanoparticles is functionalized with a plurality of pigment molecules of a Melanin type compound.

(22) The method of (21) further including removing a silica core of the plurality of silica nanoparticles.

The invention claimed is:

1. An optical system comprising:
an optical element configured to generate or manipulate visible light; and
a film for absorbing visible light, the film including a plurality of silica nanoparticles,
wherein a surface of at least a part of the plurality of silica nanoparticles is functionalized with a plurality of pigment molecules of a Melanin compound, and the film is at a position relative to the optical element to reduce stray visible light from interfering with visible light output from the optical system,
wherein an average size of each of the plurality of silica nanoparticles is in a wavelength range of the visible light, and
wherein at least a part of pairs of neighboring pigment molecules of the plurality of pigment molecules is cross-linked, wherein the cross-linked is selected from the group consisting of a diamine, a dihydrazide, a borate ion, and a dicarbamate.

2. The optical system according to claim 1, wherein the plurality of silica nanoparticles is embedded in a polymeric matrix.

3. The optical system according to claim 2, wherein the polymeric matrix includes at least one of a resin, an epoxy resin, a plastic, and a biodegradable polymer.

4. The optical system according to claim 2, wherein the polymeric matrix is nanostructured for increasing an effective surface area of the film, thereby increasing visible light absorbance of the film.

5. The optical system according to claim 2, wherein a top layer of the polymeric matrix is removed such that some of the plurality of silica nanoparticles are located at a surface of the polymeric matrix.

6. The optical system according to claim 1, wherein the Melanin compound is a Eumelanin compound.

7. The optical system according to claim 1, wherein the cross-linked pairs of the at least a part of pairs of neighboring pigment molecules of the plurality of pigment molecules are cross-linked based on the diamine.

8. The optical system according to claim 1, wherein the cross-linked pairs of the at least a part of pairs of neighboring pigment molecules of the plurality of pigment molecules are cross-linked based on the dihydrazide.

9. The optical system according to claim 1, wherein the cross-linked pairs of the at least a part of pairs of neighboring pigment molecules of the plurality of pigment molecules are cross-linked based on the borate ion.

10. The optical system according to claim 1, wherein the cross-linked pairs of the at least a part of pairs of neighboring pigment molecules of the plurality of pigment molecules are cross-linked based on the dicarbamate.

11. The optical system according to claim 1, wherein the optical system includes a housing for the optical element and the surface is an internal surface of the housing.

12. The optical system according to claim 1, wherein the optical system includes at least two optoelectronic devices and the surface is between the at least two optoelectronic devices.

13. The optical system according to claim 12, wherein the at least two optoelectronic devices are visible light sources.

14. An optical system comprising:
an optical element configured to generate or manipulate visible light; and
liquid paint for absorbing visible light, the liquid paint being provided at a position relative to the optical element to reduce stray visible light from interfering with visible light output from the optical system, the liquid paint including
a plurality of silica nanoparticles, wherein a surface of at least a part of the plurality of silica nanoparticles is functionalized with a plurality of pigment molecules of a Melanin compound,
wherein an average size of each of the plurality of silica nanoparticles is in a wavelength range of the visible light, and
wherein at least a part of pairs of neighboring pigment molecules of the plurality of pigment molecules is cross-linked, wherein the cross-linked is selected from the group consisting of a diamine, a dihydrazide, a borate ion, and dicarbamate.

15. The optical system according to claim 14, further comprising a polymer.

16. The optical system according to claim 14, wherein the Melanin compound is a Eumelanin compound.

17. A method for providing a film for absorbing visible light in an optical system, the method comprising:
providing a plurality of silica nanoparticles on a surface of an object at a position relative to an optical element in the optical system to reduce stray visible light from interfering with visible light output from the optical system, wherein a surface of at least a part of the plurality of silica nanoparticles is functionalized with a plurality of pigment molecules of a Melanin compound,
wherein an average size of each of the plurality of silica nanoparticles is in a wavelength range of the visible light, and
wherein at least a part of pairs of neighboring pigment molecules of the plurality of pigment molecules is cross-linked, wherein the cross-linked is selected from the group consisting of a diamine, a dihydrazide, a borate ion, and dicarbamate.

\* \* \* \* \*